United States Patent [19]
Mundy

[11] 3,871,251

[45] Mar. 18, 1975

[54] CUTTING TOOL FOR THE CONTINUOUS MACHINING OF METALS AND THE METHOD OF MAKING SAME

[75] Inventor: William L. Mundy, St. Louis, Mo.

[73] Assignee: O'Fallon Investment Company, Maryland Heights, Mo.

[22] Filed: June 24, 1974

[21] Appl. No.: 482,608

Related U.S. Application Data

[60] Division of Ser. No. 304,771, Nov. 8, 1972, which is a continuation-in-part of Ser. No. 45,357, June 11, 1970, abandoned.

[52] U.S. Cl. .................. 76/101 A, 29/95, 82/1 C
[51] Int. Cl. ....... B21k 21/00, B26d 1/00, B23b 3/00
[58] Field of Search ............ 29/95, 95 B, 95 C, 103, 29/103 A; 76/101, 101 A; 82/1 C

[56] References Cited
UNITED STATES PATENTS

| | | | |
|---|---|---|---|
| 2,164,303 | 7/1939 | Berg et al. | 29/95 |
| 3,803,950 | 4/1974 | Wasser | 76/101 A |

OTHER PUBLICATIONS

Article–Bearing Lands and Negative Rake–by Purser from American Machinist, 8/2/45, pgs. 118–121.
Article–Cutting Force–by Heinmann–from The Tool Engineer, March 1960, pgs. 101–104.
Book–Metal Cutting Tools–First Ed. McGraw–Hill Book Co.–by A. L. Deleeuw, Ch. XIII, pgs. 212–225. P.O. Library TJ1185D44.

*Primary Examiner*— Harrison L. Hinson
*Attorney, Agent, or Firm*—Rogers, Ezell & Eilers

[57] ABSTRACT

A cutting tool made of a material having a high red hardness for the continuous machining of metals and having a geometry determined by the change in measurements of a sample of the metal being machined when the sample is externally loaded to failure. The sample is subjected to a tensile load to produce the failure. Elongation and neck down are caused in the failure area according to the ductility of the metal. The effective cutting or rake angle of the cutting tool is established as a function of the elongation and neck down of the sample. The relief angles of the cutting tool geometry are determined to maintain a self-sharpening cutting edge under the abrasive characteristics of the workpiece material and erosion characteristics of the cutting tool material for given machining conditions.

The effective rake angle of the cutting tool is also established as the minimum angle producing chips of maximum hardness during the machining operation.

2 Claims, 19 Drawing Figures

CUTTING TOOL FOR THE CONTINUOUS MACHINING OF METALS AND THE METHOD OF MAKING SAME

This is a division of application Ser. No. 304,771, filed Nov. 8, 1972, which was a continuation-in-part of application Ser. No. 45,357 filed June 11, 1970, now abandoned.

SUMMARY OF THE INVENTION

This invention relates to a cutting tool for the continuous machining of metal such as the type used in a lathe, planer, shaper, or the like, and particularly to a method of defining the correct geometry for a cutting tool for a particular machining operation, a cutting tool having a geometry so defined, and a method of machining the metal with the cutting tool.

Heretofore the primary considerations in determining cutting tool geometries have been to look to the cutting tool for direction as to what these geometries should be. For example, prior art tools made of carbide, such as tungsten carbide, titanium carbide, tantalum carbide, or the like, have been made with negative rake angles and very small relief angles for machining nearly all materials. The reasons usually given for this are that the carbides have extremely high red hardness and compressive strength. The negative geometry creates cutting pressures which are directed into the body of the carbide tool thus utilizing the extreme compressive strength of the carbides. Low relief angles also add support to the cutting edge. This philosophy romanticizes the compressive capability of the carbides and creates conditions of inefficient cutting which generate such excessive heats and pressures that only a tool having the high red hardness and compressive strength of carbide could survive. In addition, the compressive forces directed at the tool result in equal and opposite forces being directed into the workpiece. Minute surface damage thus generated can be a source of catastrophic failure in parts which are subsequently subjected to extreme conditions of stress such as vibrational stress or corrosive stress.

This invention represents a complete departure from this old philosphy. According to this invention, the proper rake angles are determined by the material to be machined and not by the cutting tool. It is the characteristics of the workpiece that teaches the proper tool geometry and this is determined by the physical effect of externally loading a sample of the metal workpiece to failure.

The cutting of metal by a cutting tool is a form of failure. Unless the cutting tool can create the failure, no cutting takes place. If an excessive amount of work is required to produce the failure, heat and wear and tear on the cutting tool, overheating of the chip cut from the workpiece, and damage to the surface of the workpiece can occur. If the metal failure created by the cutting process can be accomplished with minimum work, there will be minimum heat and wear and tear on the cutting tool, a lower chip temperature, and minimum damage created within the surface of the workpiece. The result is optimum cutting efficiency and longer tool life.

The amount of work required to cut metal with a cutting tool for a given set of cutting conditions varies with the geometry of the cutting tool. In this invention, a sample of the metal to be cut is subjected to a tensile load that will cause failure of the metal sample. Measurements of the changes in dimensions resulting from failure of the sample are made. From these measurements the proper tool geometry is calculated.

Tension tests are used to establish the proper cutting tool geometry because although the failure in metal during cutting is in compression in the immediate area of the cutting edge of the cutting tool, the cut metal is immediately directed away from the cutting area and is therefore unrestrained, avoiding metal interference that exists in conventional compressive loading. Accordingly, the machining of a workpiece produces the same type of granular slippage as is produced by tensile loading of a sample of the workpiece, and in this important respect the types of failure are the same.

Hence, according to this invention a test bar of the same material as the workpiece to be machined is loaded under tension to failure. When the tensile forces become of sufficient magnitude to cause the metal to fail, the area at the failure is in the form of a cup cone with the peripheral surfaces of the cup cone being at a fixed angle to the axis of the metal measured in the direction of the applied tensile forces. This angle is a constant for a given metal and is generally accepted as being forty-five degrees. Also, the cup cone area exhibits high hardness because maximum stress levels are attained at the cup cone break. These maximum stress levels result in maximum work hardening of the sample in the cup cone area. Prior to failure, elongation and neck down of the metal test bar occur. The percent of elongation and the angle of neck down vary with different metals, generally depending on the ductility of the metal. However, for a given metal, the percent elongation and the neck down angle are substantially uniform when several samples of the same material are tensile loaded to failure.

Since there are two physical changes in the geometry of the test specimen, elongation and neck down, there are two forces that are considered relevant. One is the tensile force producing elongation, and the other is the internal attractive force within the metal that causes neck down. These forces are at right angles to one another since the metal creates the neck down through internal attraction at a right angle to the direction of the elongation of the metal.

Before failure occurs under tensile loading of the test bar, the material in the neck down area must be deformed a specified minimum amount which is the result of the elongation and neck down. If it is not so deformed, failure will not occur. Similarly, before failure can occur in the metal workpiece being machined, the metal being cut must be deformed that same minimum amount. Therefore, according to this invention the cutting angle of the cutting tool required to deform the metal of the workpiece the required minimum amount to produce failure, is a function of the neck down angle and the elongation of the test specimen when loaded under tension to failure. This cutting angle is called the effective rake angle.

As a corollary, because the test sample in the area of the cup cone where failure occurs has been work hardened to its maximum hardness, and because machining of metal produces this same type of failure, the proper effective rake angle C may also be defined as the minimum angle producing the maximum hardness of chips during machining.

Another aspect of this invention involves the proper selection of the relief angles of the cutting tool. Just as with the rake angles, the relief angles of the prior art tools were chosen to be as small as possible in order to maintain the greatest support for the cutting edge. This has been particularly true of carbide cutting tools. In contrast, the cutting tool of this invention is made self-sharpening by recognizing the abrasive characteristics of some workpiece materials and properly selecting the side and end relief angles on the cutting tool so as to maintain the cutting edge by abrasive action of the workpiece material during the machining process.

To strengthen the cutting edge of the tool, a thin wear land is formed just beneath the cutting edge and another at the end of the cutting edge, these lands having a substantially zero relief angle. As the tool cuts the workpiece, the chip being formed tends to erode the top surface or face of the tool at the cutting edge to form a crater, and the surface of the workpiece tends to erode the wear lands. These erosions become greater as machining continues. The rates of these erosions will not necessarily be the same and will depend on the tool and workpiece materials and the feed and speed used in machining. However, for given materials and given feed and speed, the rate of erosion of the face of a given tool will be constant and the rates of erosion of the wear lands will be constant although not necessarily equal. If during machining, the widths of the wear lands, due to an imbalance in erosion, become smaller, the cutting edge will become too sharp, be unsupported, and break off. On the other hand, if the widths of the wear lands increase, a point will be reached where the excessive wear lands will cause rubbing, chattering, and tool failure. But if the widths of the wear lands become constant during the machining process, the erosion of the top face balanced with the erosions on the wear lands, the tool becomes effectively self-sharpening for greatly increased tool life. This can be achieved by proper selection of the side and end relief angles, and it is a feature of this invention that the relief angles are so selected.

Hence, it is a primary object of this invention to produce a cutting tool having a geometry that cuts a metal workpiece with minimum work and maximum efficiency for greatly improved tool life, and to define the procedures for determining that geometry.

DESCRIPTION OF THE DRAWINGS:

All figures are generally diagrammatic.

DETAILED DESCRIPTION OF PREFERRED EMBODIMENTS:

This invention is primarily directed to a method for defining the correct geometry of cutting tools adapted for the continuous machining of metal, to cutting tools having geometries so defined, and to a method of machining the metals with the cutting tools. In its preferred embodiments, the invention is directed to such tools made of a material having a high red hardness. By this it is meant that the temperature at which these tools maintain their cutting effectiveness is in excess of approximately 1,200° F. Such materials embrace the carbides including those of tungsten, tantalum, titanium, etc.; ceramics such as those based on alumina, silica, and the like; natural and synthetic diamond; etc. Of these materials, all generally known to the art, the carbides represent a particularly preferred class. Such materials are treated in numerous references, among which may be cited "Machining Data Handbook", 2nd edition, Metcut Research Associates, Inc., Cincinnati, Ohio, 1972, pp. 789–793.

Although the principles of this invention, as the same are described hereafter, will be understood to apply generally to tools adapted for the continuous machining of metal, such as for example lathe tools, drills, end mills, reamers, broaches, and the like, the description herein is directed to lathe tools for ease in understanding the invention. By "continuous machining" here is meant the more or less constant machining of metal as occurs in machine tools, although a continuous chip may or may not be formed. In "continuous machining of metal" a substantially constant velocity is maintained between the workpiece being cut and the cutting tool throughout a cutting operation. Tools used in such machining include, for example, lathe tools, broaches, drills, end mills, and so forth. It will be appreciated that the cutting tools of this invention are adapted for the "continuous machining of metal," as in a power operated machine, and hence will ordinarily include a support section, such as a shank or rod, which may be gripped in a cutting tool holder of the machine, such as in the tool holder of a lathe. Rigidly attached to the supporting portion of the tool is the cutting portion of the tool having a cutting edge and cutting angles defined as hereinafter described. In some instances the cutting portion is silver soldered or otherwise attached to the supporting portion of the cutting tool. In other instances, such as the preferred embodiments described herein, the cutting tool is of a single material, one end thereof being adapted for mounting in a metal working machine and the other end including a cutting edge for cutting a metal workpiece. It will be noted that each of these tool configurations is characterized by including a support portion for attachment of the tool in a metal working machine, and a cutting portion which includes a cutting edge and cutting angles as defined herein.

Figures 1, 4:
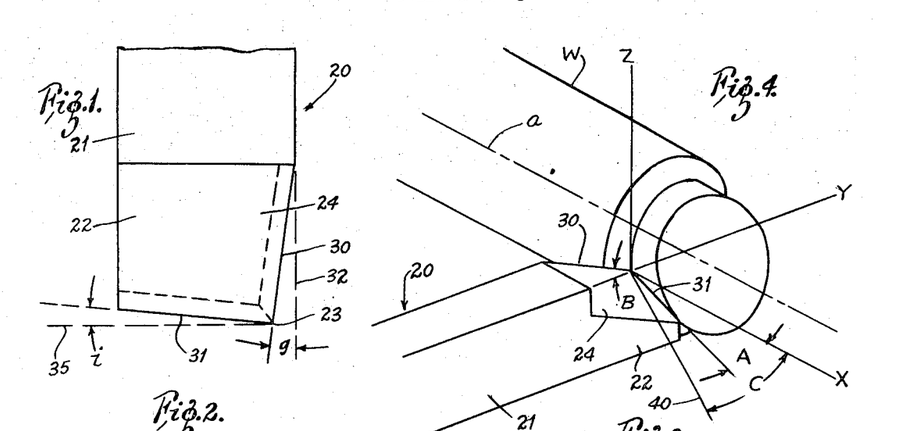
FIG. 1 is a fragmentary plan view of a lathe cutting tool of this invention and of the kind having primary and secondary rake angles.
FIG. 4 is a fragmentary isometric view of the tool of FIG. 1, but without side and end cutting edge angles or relief angles, and showing the cutting tool geometry as it relates to a coordinate system of the workpiece.
Figures 2, 3, 5:
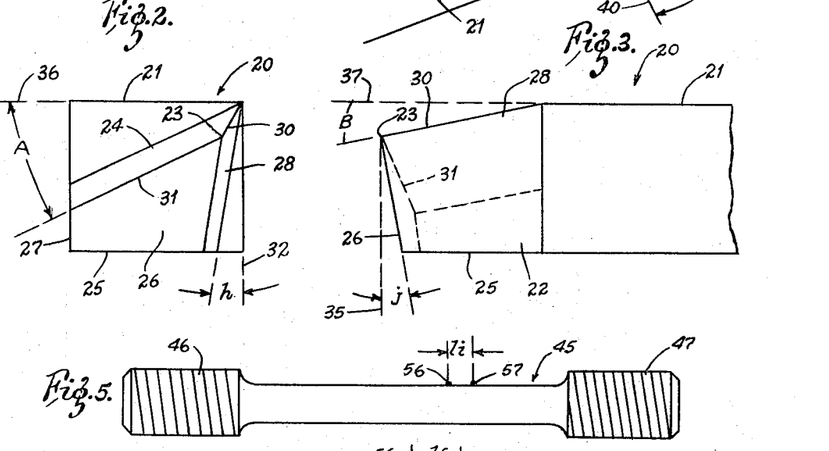
FIG. 2 is a front view of the tool of FIG. 1.
FIG. 3 is a left side view of the tool of FIG. 1.
FIG. 5 is a side view of a metal test bar sample of a material identical to that to be cut.

FIGS. 1, 2, and 3 illustrate a lathe cutting tool 20, which is also shown in FIG. 4 cutting a workpiece W but without any clearance and relief angles so that the locations and determinations of primary, secondary, and effective rake angles can be illustrated and described. The geometry of the tool 20, including its various angles, will be described relative to the workpiece, as is customary in the art, using a three-dimensional X,Y,Z coordinate system. The coordinates XY define a plane through the point of the tool and axis $a$ of the workpiece W; the coordinates XZ define a plane through the point of the tool and normal to the XY plane and parallel to the axis $a$; and the coordinates YZ define a plane through the point of the tool and normal to both the XY and XZ planes. Tools having geometries defined relative to other coordinate references can be easily transformed mathematically to the coordinate system used herein. The tools of this invention will be described without chip breakers, which are known in the art, although these can be provided if desired.

The tool 20 has a shank 21 and a nose 22, the nose 22 having a cutting point 23, a face 24, a base 25, an end relief surface 26, a side 27, and a side relief surface 28. The nose 22 also has a cutting edge 30 and an upper front edge 31.

As viewed in FIGS. 1 through 3, and relative to the coordinate system of FIG. 4, the horizontal angle that the cutting edge 30 makes with a vertical plane parallel to the YZ plane and shown by a line 32 is the side cutting edge angle designated as the angle $g$, and the vertical angle that the side relief surface 28 makes with the vertical plane 32 is the side relief angle designated as the angle $h$. The horizontal angle that the upper front edge 31 makes with the vertical plane XZ, shown by the line 35, is the end cutting edge angle designated as the angle $i$, and the vertical angle that the end relief surface 26 makes with the vertical plane 35 is the end relief angle designated as the angle $j$.

The angle the upper front edge 31 makes with a horizontal plane parallel to the XY plane and shown by a line 36, prior to providing the end cutting edge angle $i$, as shown in FIG. 2, is the primary cutting or rake angle A. The angle the cutting edge 30 makes with the same horizontal plane shown by a line 37 prior to providing the side cutting edge angle $g$, as best shown in FIG. 3, is the secondary cutting or rake angle B. While the angle B is shown to be negative in accordance with standard tool nomenclature, the cutting edge 30 sloping downwardly toward the point 23, the angle B could also be positive, the cutting edge 30 sloping upwardly toward the point 23, only the magnitude of the angle B being of consequence within the limitations to be described.

The effective rake angle C is illustrated in FIG. 4. It is determined by calculating the resultants of the primary and secondary rake angles A and B. On the tool 20 of FIG. 4, the effective rake angle C is measured between the X axis and a line 40 drawn on the same plane as the face 24 of the tool 20. The magnitude of the effective rake angle C is determined by the formula $\cos c = \cos A \cos B$ as is commonly known in the art.

It is to be understood that not all tools have primary and secondary rake angles, some having only a primary (effective) rake angle. In those having no secondary rake angle, the secondary rake angle B being zero, cosine B is equal to one, and hence the effective rake angle C is equal to, or the same as, the primary rake angle A.

In the orientation of the tool in FIGS. 1 through 4, the workpiece being machined moves past the tool in a downward direction as viewed in FIG. 2 through 4, and the tool is fed to the right as viewed in FIG. 2 during machining. The nomenclature heretofore used in describing the tools of FIGS. 1 through 4 will also be used hereinafter where appropriate in describing tools of other embodiments of this invention.

The manner of determining the magnitude of the effective rake angle C, which is the most critical angle, in accordance with this invention will now be described.

The cutting or machining of material from a metal workpiece is achieved by producing a failure in the metal. Unless the cutting tool can create the failure, no cutting takes place. It has been found that tool life is directly related to the amount of work required to produce the failure during the machining process. For a given workpiece and for a given machining operation, the more work required to produce failure, the shorter the tool life, and conversely the less work required to produce the failure, the greater the tool life. Hence, the greatest tool life is achieved where the cutting or failure is accomplished with minimum work and maximum efficiency.

The amount of work required to cut metal with a cutting tool for a given set of cutting conditions, such as feed and speed of cutting, varies with the geometry of the cutting tool. It is a basic concept of this invention that the geometry of the cutting tool is determined directly from the characteristics of the metal being cut and specifically from a sample of that metal subjected to a tensile load that will cause failure of the metal sample. Certain of the changes that take place in the metal sample when loaded to failure are directly related to the changes that take place in the metal workpiece when cut or machined. Because of these relationships, the effective rake angle C can be determined from measurements of the changes in the physical characteristics resulting from failure of the sample under tensile load. A theory will be advanced for why these relationships hold true, but first the procedure for determining this angle in accordance with this invention will be described.

Figure 6:
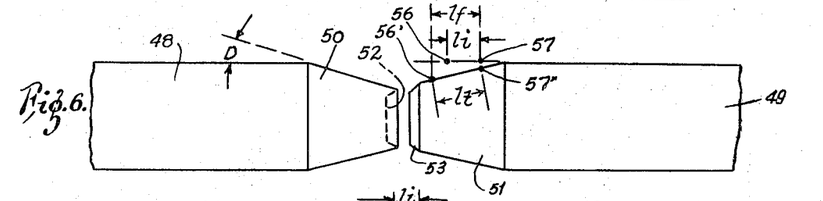
FIG. 6 is an enlarged fragmentary side view of the test bar sample of FIG. 5 following failure under tensile loading.

FIG. 5 shows a bar 45 with ends 46 and 47 that are held in a tensile loading device (not shown) to load the bar 45 until it fails. Two marks 56 and 57 are made on the bar to define an initial length $l_i$ of a bar section prior to loading. FIG. 6 shows diagrammatically the condition of the bar 45 at failure. Characteristically, the two sections 48 and 49 created by the break have elongated, and on opposite sides of the break there are neck down sections 50 and 51, the surface angle of each neck down section measured from the axis of the applied tensile force being designated as angle D. Where the actual break occurs, an internal frusto-conical well 52 is formed on the part 48 and a complementary external frusto-conical section 53 is formed on the end of the section 49. The marks 56 and 57 have elongated to positions 56' and 57' on the surface of the neck down area. The distance between the marks indicated at 56' and 57' in FIG. 6, measured parallel to the axis of the bar 45 is $l_f$. However, the true distance between the marks 56' and 57' located within the neck down area is $l_t$.

In accordance with this invention the effective rake angle C of the cutting tool is determined by the formula $\cos C = l_i/l_f \cos D$. The angle D can be measured directly from the test bar of FIG. 6, and $l_i$ from the test bar of FIG. 5; however, for $l_f$ there is no assurance that the marks, such as the marks 56 and 57 when elongated will lie within the neck down section, and it is the measurement of elongation within the neck down or failure area that is required. In addition, a bar of uniform cross section, such as the bar 45, may have several neck down or partial neck down areas, making measurements of elongation unreliable.

Figure 7:
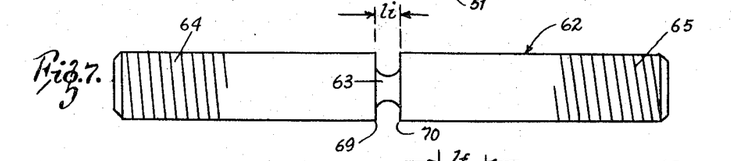
FIG. 7 is a side view of another test bar sample having an area of reduced cross section to isolate the plane where failure will occur.
Figure 8:
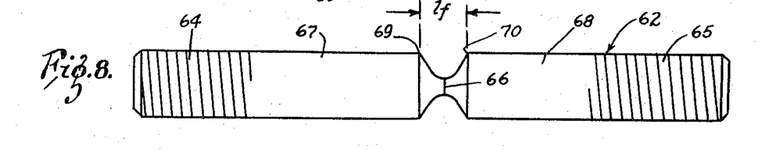
FIG. 8 is a side view of the test bar sample of FIG. 7 following failure under tensile loading.

To obtain a more accurate measure of elongation, a bar such as the bar 62 shown in FIGS. 7 and 8 is used. The bar 62 has an annular groove 63 to localize the area where failure will occur in tensile loading. The ends 64 and 65 of the bar 62 are clamped in a tensile loading device (not shown) to produce the break 66 illustrated in FIG. 8, separating the bar 62 into two sections 67 and 68. The distance between edges 69 and 70 of the annular groove 63 before elongation is $l_i$, and the distance between these edges 69 and 70 after elongation is $l_f$ as indicated in FIG. 8. Since the bar 62 has a localized area (the annular groove 63) where failure will occur, $l_i$ and $l_f$ can be accurately measured.

Hence, the dimensions $l_i$ and $l_f$ are determined by loading the bar 62 to failure and measuring the length of the notch before and after loading, and the angle D is determined by loading the bar 45 to failure and measuring the neck down angle D directly. The effective rake angle can then be calculated from the formula $\cos C = l_i/l_f \cos D$.

Figures 9, 13, 14, 15, 16:
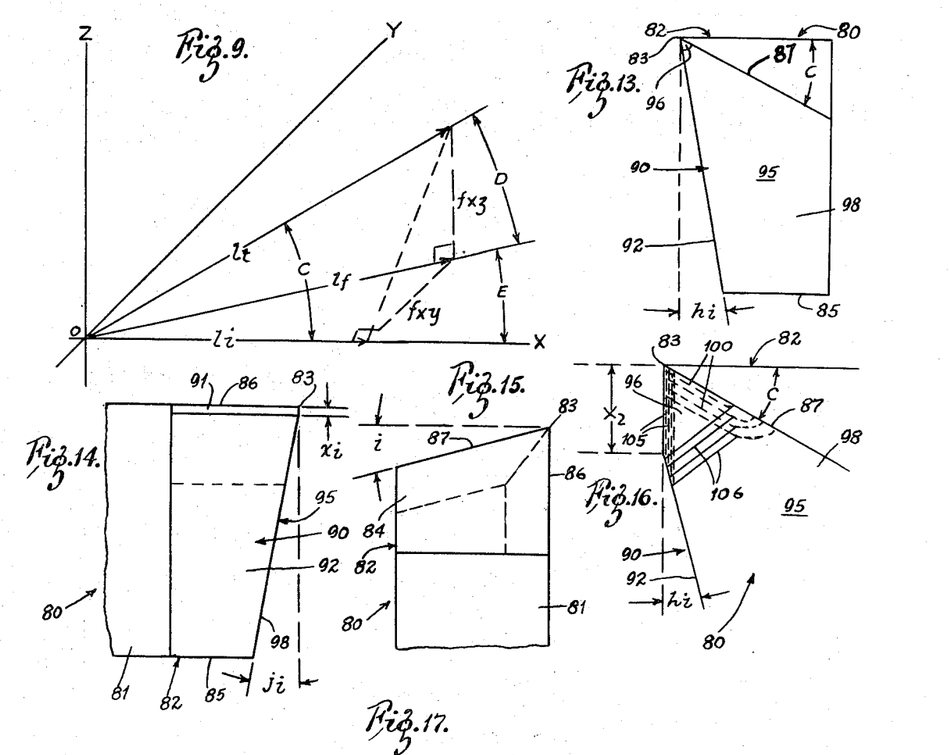
FIG. 9 is a three-dimensional geometric diagram illustrating the relationship between the primary, the secondary, and the effective rake angles, and the relationship between the applications of forces in a metal failure.
FIG. 13 is a front view of a lathe tool of another embodiment of this invention.
FIG. 14 is a right side fragmentary view of the tool of FIG. 13.
FIG. 15 is a fragmentary plan view of the tool of FIG. 13.
FIG. 16 is an enlarged view of the tip portion of FIG. 13.

FIG. 9 illustrates vectorially the geometric relationship between $l_i$, $l_f$, and $l_t$ with respect to three-dimensional coordinate axes X, Y, and Z with the X coordinate being parallel to the axis of the test specimen. If the metal sample of length $l_i$ is deflected by a force $f_{xy}$ through an angle E, a new length $l_f$ is reached. Since the difference between $l_f$ and $l_t$ is caused by neck down, and neck down is produced by an internal force in the metal at right angles to the applied tensile force, a force $f_{xz}$ applied to the new length $l_f$ through the angle D creates a new length $l_t$. The forces $f_{xy}$ and $f_{xz}$ are at right angles to one another, $f_{xy}$ being in the XY plane and $f_{xz}$ being parallel to the XZ plane and perpendicular to the XY plane. The resultant of these forces establishes the angle C between $l_i$ and $l_t$, the initial length before elongation and the true length after failure.

Therefore, it can be seen from FIG. 9 that $\cos C = l_i/l_t$; $\cos E = l_i/l_f$; $\cos D = l_f/l_t$; or $\cos C = \cos E \cos D$.

Referring again to the lathe tool 20 of FIGS. 1 through 4, where the tool, such as the tool 20, has both a primary rake angle A and a secondary rake angle B such that $\cos C = \cos A \cos B$ as heretofore described, because cos C in accordance with this invention is equal to cos E cos D, the primary rake angle A can be made equal to the angle E and the secondary rake angle B can be made equal to the angle D. However, this is not critical. It is only critical to define C by the formula $\cos c = \cos E \cos D$ and once so defined the angles A and B can be varied within practical limits so long as the products of their cosines id equal to cos C.

Figure 10:
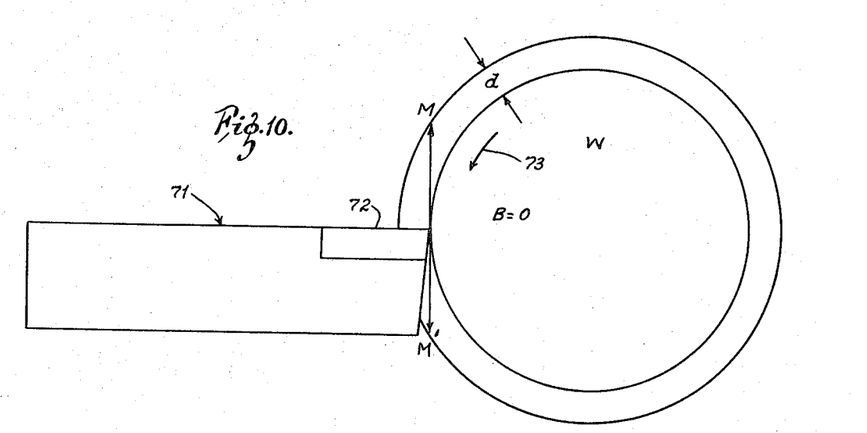
FIGS. 10, 11, and 12 are side views of cutting tools shown cutting a workpiece for the purpose of illustrating practical limitations in the magnitude of the secondary rake angle.
Figure 11:
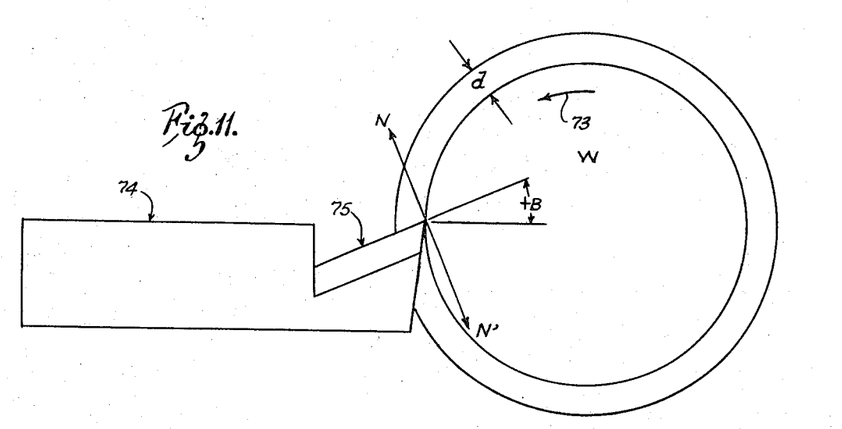
Figure 12:
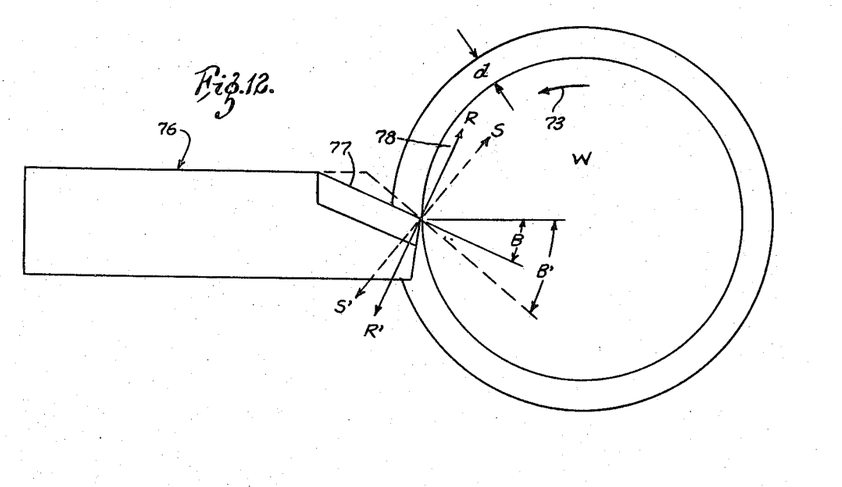

These practical limits relate to the angle B, and can be best explained by referring to FIGS. 10 through 12.

FIG. 10 shows a cutting 71 having a cutting edge 72 and a secondary rake angle equal to zero. The tool 71 is shown cutting a metal workpiece W with the depth of cut, or chip depth, shown by $d$. The direction of rotation of the workpiece W is shown by the arrow 73, and the tool is viewed looking into the headstock of the lathe with the tool feeding toward the headstock. With a secondary rake angle B equal to zero, the cutting tool 71 introduces a force M into the workpiece W and in a direction generally limited to the chip area or chip depth so that very little energy is wasted in unnecessarily deforming the workpiece. A force M', equal and opposite to the force M, is directed as shown into the point of the tool. An angle B of zero is considered a satisfactory compromise which generally limits the deformation of the workpiece to the chip area while utilizing the compressive strength of the tool to reduce the possibility of chipping or breakage at the point and providing sufficient mass in the cutting area to conduct heat away from the cutting edge.

FIG. 11 is generally the same as FIG. 10 except it shows a tool 74 having a cutting edge 75 and a positive secondary rake angle B. With angle B positive, the tool 74 has the advantage over the tool 71 in that it offers more assurance that the deformation of the workpiece W will be limited to the chip area as shown by the direction of the force N, but has the disadvantage in introducing a force N', equal and opposite to the force N, into the point of the tool which tends to chip or break the point. Also, as the angle B becomes more positive, there is less mass at the cutting area of the tool to conduct heat away from the cutting edge. While a small positive angle B is desirable to insure a minimum of wasted energy caused by unnecessary workpiece deformation, its magnitude is limited due to the decrease in compressive capability at the point of the tool, and the decrease in mass to conduct heat, as the angle B becomes more positive.

FIG. 12 is much like FIGS. 10 and 11 except that it shows a tool 76 having a cutting edge 77 and a negative secondary rake angle B. With a negative angle B the cutting tool 76 introduces a force R into the workpiece as shown, which in contrast to the tools 71 and 74, deforms an area 78 of the workpiece beyond the depth of the chip. This results in wasted energy and represents a disadvantage over the tools 71 and 74. However, the tool 76 offers an advantage in introducing a force R', which is equal and opposite to the force R, and in a direction to utilize the compressive strength of the tool to an even greater degree than the tool 71. The tool 76 also provides greater mass at the cutting area than the tool 74 to conduct heat away from the cutting edge. As the angle B becomes more negative, as shown by the dashed lines and the angle $-B'$, still more energy is wasted because of this deformation as shown by the direction of the force S. Hence, while in some applications a small negative angle B is desired to utilize the compressive strength of the tool and reduce the likelihood of the point chipping, and to gain additional mass to conduct heat, its magnitude must be limited to avoid excessive deformation of the workpiece.

Even where a positive or negative angle B is deemed desirable, a small magnitude is generally sufficient. For example, angles B of less than ten degrees in magnitude are most common.

FIGS. 13 through 16 show another embodiment of this invention with a cutting tool 80.

The cutting tool 80 is shown with a secondary rake angle B and a side cutting edge angle g for clarity. The cutting tool 80 has a shank 81, and a nose 82, the nose 82 having a cutting point 83, face 84, a base 85, a cutting edge 86, and an upper front edge 87. Because the secondary rake angle B is zero, the primary rake angle A is the same as the effective rake angle C shown in FIG. 13. In this orientation of the tool in FIGS. 13 through 16, the workpiece being machined moves past the tool in a downward direction as viewed in FIGS. 13, 14, and 16, and the tool is fed to the right as viewed in FIG. 15 during machining.

As best shown in FIG. 14 the side relief surface generally designated as 90, rather than being formed in a single plane to meet the face 84 at the cutting edge 86 as with the tool 20, is ground away at its upper end just beneath the cutting edge 86 to form a narrow side land 91. The side land 91 has a width designated $x_1$ shown in FIG. 14 and has a side relief angle of substantially zero. The remaining portion 92 of the side relief surface 90, and which lies just beneath the side land 91, has a side relief angle $h_1$.

In a similar manner, and as best shown in FIGS. 13 and 16, the tool 80 has an end relief surface 95 having an upper portion 96 near the point 83 formed in what will be referred to as an end land having a width designated $X_2$ and a substantially zero end relief angle. The remaining portion 98 of the end relief surface 95 is formed with an end relief angle $j_1$.

It will be noted that while the side land 91 extends substantially all the way across the top of the nose 82, the end land 96 is only a small generally triangular surface, formed only near the point 83. This is because substantially the entire side land 91 is in contact with the workpiece during the machining process, whereas only a very small portion at the top of the end relief surface, the size of the end land 96, actually contacts the workpiece because of the end cutting edge angle $i$ of the tool 80 (see FIG. 15).

The reason for forming the side and end relief surfaces 90 and 95 with land surfaces, and relief angles as shown is two-fold. First, formation of the cutting tool in this manner strengthens the cutting edge 86 and point 83 to prevent chipping under the tremendous loads created during the machining process. This is particularly important where the cutting tool is made of a very hard and brittle material such as a carbide tool, although certainly superior results are achieved with tool materials with less hardness such as high-speed steel tools as well. A second important reason involves the machining of relatively high abrasion materials such as, for example, AISI 4340 Steel.

When machining high abrasive materials, such as those of the type mentioned, the chip from the material as it is formed during the machining process wears away the faces of the cutting tool near the cutting edge 86. This erosion continues to create a crater on the face 84 of the cutting tool. The dashed lines generally shown as 100 of FIG. 16 show the cutting tool near its cutting edge at various stages of erosion.

With cutting tools having negative effective cutting angles or relatively small effective cutting angles such as, for example, below ten degrees, chips from an abrasive material create forces in a direction which tend to break off the cutting edge. When this occurs, the tool quickly fails, thus greatly reducing the life of the tool.

In addition to eroding the tool on its face 84, the abrasive workpiece also erodes the side relief surface 90 near the cutting edge 86, and the end relief surface 95 near the point 83 since these areas are in contact with the workpiece during the machining operation. The dashed lines 105 and solid lines 106 of FIG. 13, respectively, show these latter types of erosion at various stages during the machining process. Erosion of the side and end relief surfaces 90 and 95 will occur regardless of whether the side and end lands and relief surfaces are formed in accordance with this embodiment of the invention. However, if not so formed, it has been found that as these erosions occur, and if the relief angles of the side and end relief surfaces are improperly selected, either the erosion 100 on the face of the tool will occur at too great a rate as compared to the erosions 105 and 106 on the side and end relief surfaces 90 and 95, tending to sharpen the cutting edge so that it will eventually be unsupported, break off and fail, or the erosions 105 and 106 will be too great relative to the erosion 100 causing the widths $X_1$ and $X_2$ of the side and end lands 91 and 96 to become greater and greater. When these widths become too great, the cutting tool begins to rub and chatter, and finally fails.

Hence, in accordance with this invention, the secondary side and end relief angles $h_1$ and $j_1$ are selected such that the widths of the side and end lands 91 and 96 become constant during the machining process. In other words, with the proper selection of the angles $h_1$ and $j_1$ and the widths $X_1$ and $X_2$, cratering of the face 84, and erosion of the relief surfaces 90 and 95 balance each other to produce a constant cutting edge 86 under the abrasive action of the workpiece.

The widths $X_1$ and $X_2$ for a given tool material and a given workpiece material are dependent on the feed and speed used in the machining operation. The greater the speed and feed, the greater the erosions of the lands 91 and 96, and the greater the widths should be. But generally for a given feed and speed, the widths $X_1$ and $X_2$ should be selected so as not to be so small that the cutting edge will chip under the heavy loads during machining, and yet not so large as to cause rubbing, chatter, and almost immediate tool failure. Examples of values for $X_1$ and $X_2$ are given in actual test results hereinafter described.

With the widths $X_1$ and $X_2$ established, it is still necessary to correctly define the side and end relief angles $h_1$ and $j_1$. As stated previously, the side and end relief angles $h_1$ and $j_1$ are correctly selected when the widths $X_1$ and $X_2$ become constant throughout the machining operation. Referring to the enlarged view of FIG. 16, and remembering that the erosion rate is fixed for a given combination of tool and workpiece materials and feed and speed, it can be seen that if the side relief angle $h_1$ is too small, $X_1$ will continue to increase during the machining operation until it becomes so large that rubbing and chattering occur to produce tool failure. If, on the other hand, the angle $h_1$ is too great, the width $X_1$ will decrease during the machining operation until the cutting edge 86 becomes weak and breaks. Hence, to select the proper angle $h_1$ for a given tool material, a given workpiece material and for given feed and speed, it is only necessary on a trial and error basis to selectively vary the angle $h_1$ until the width $X_1$ remains constant. The same procedure is used to select the proper end relief angle $j_1$. Examples giving specific values for $h_1$ and $j_1$ are set forth in test results to be described.

The foregoing has been a description of a cutting tool of this invention and a method of defining the effective rake angle and relief angles of the cutting tool in accordance with this invention. The following is offered as the theory or scientific principles explaining why the invention works as described for a better appreciation for the advancement it represents in the art.

Figure 17:
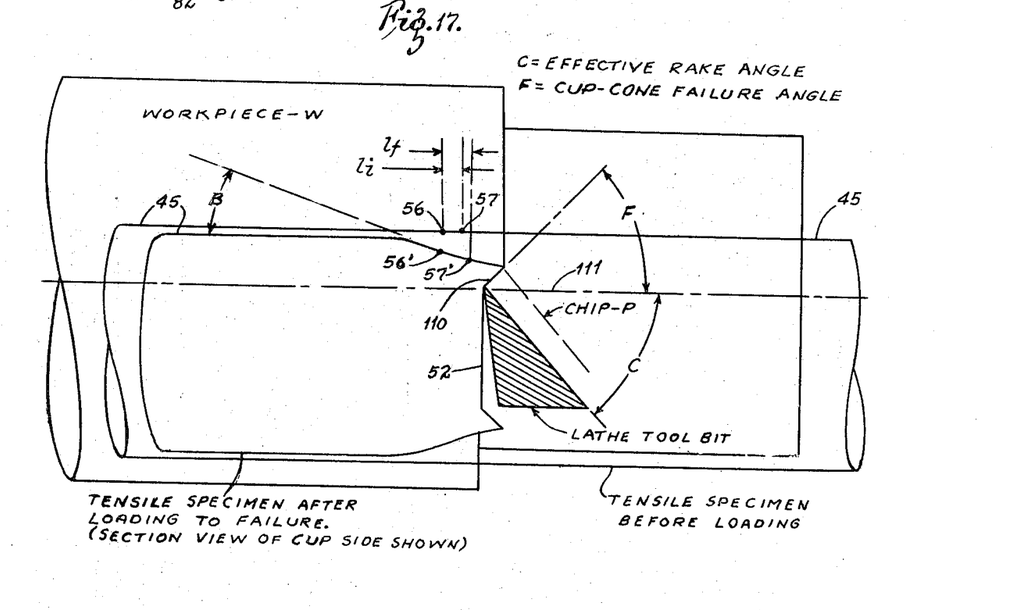
FIG. 17 is a composite diagrammatic drawing showing a lathe tool bit, a workpiece, and a chip with a tensile test specimen shown prior to and after failure superimposed thereon for the purpose of explaining the theory of the invention.

FIG. 17 is a composite drawing showing a lathe tool nose such as, for example, the nose 22 of the tool 20 or the nose 82 of the tool 80. Also shown is a workpiece W and a chip P. The workpiece W is moving in a downward direction as viewed in FIG. 17 into the cutting edge of the tool. Superimposed thereon is a portion of a tensile test specimen such as the specimen 45 of FIG. 5 prior to loading and a sectional view of the test specimen after having been loaded under tension to failure. The cup cone break profile 52, previously described with reference to FIG. 6, is arranged so as to coincide with the chip failure line 110. The direction of the chip failure line 110 and the coincidental cup failure line is designated by the angle F with respect to a line 111 at the point of the tool which line is parallel to the axis of the workpiece W and test specimen 45. The line 111 is the same as the X axis of FIG. 4. The angle F is constant for a given material and is generally accepted to be 45 degrees, although variations in grain size may make this angle appear to deviate from this value. Insofar as this explanation is concerned, it is only important that the angle F is a constant for a given material.

Also shown on the test specimen 45 prior to loading, are the points 56 and 57, the distance between these points being represented as the initial length $l_i$, and the points 56' and 57' located in the neck-down area of the test specimen after loading in tension to failure, the distance between these points being the true length $l_t$. These are the same points shown and described with reference to FIGS. 5 through 8.

In accordance with this invention, the cosine of the effective rake angle C is said to be equal to the ratio of $l_i/l_t$. Referring to the enlarged view of FIG. 18, the length $l_i$ in the cup cone area of the tensile specimen 45 prior to loading will translate from points 56 and 57 to points 56' and 57' or to a true length of $l_t$ after the tensile specimen is loaded to failure. This new length $l_t$ is the measure of the true elongation, and failure of the test specimen will not occur until the length $l_i$ has been elongated to a length $l_t$. When the length $l_t$ is reached under the influence of both linear elongation and neck down under tensile loading, failure occurs. A halt in tensile forces just prior to attaining a length $l_t$ results in an unbroken tensile specimen. Correspondingly, the instant the tensile force is great enough that the length $l_t$ is attained, failure is irreversible and complete. The amount of work necessary to achieve the length of $l_t$ is the measure of the minimum work expended to break the tensile specimen.

Figure 18:
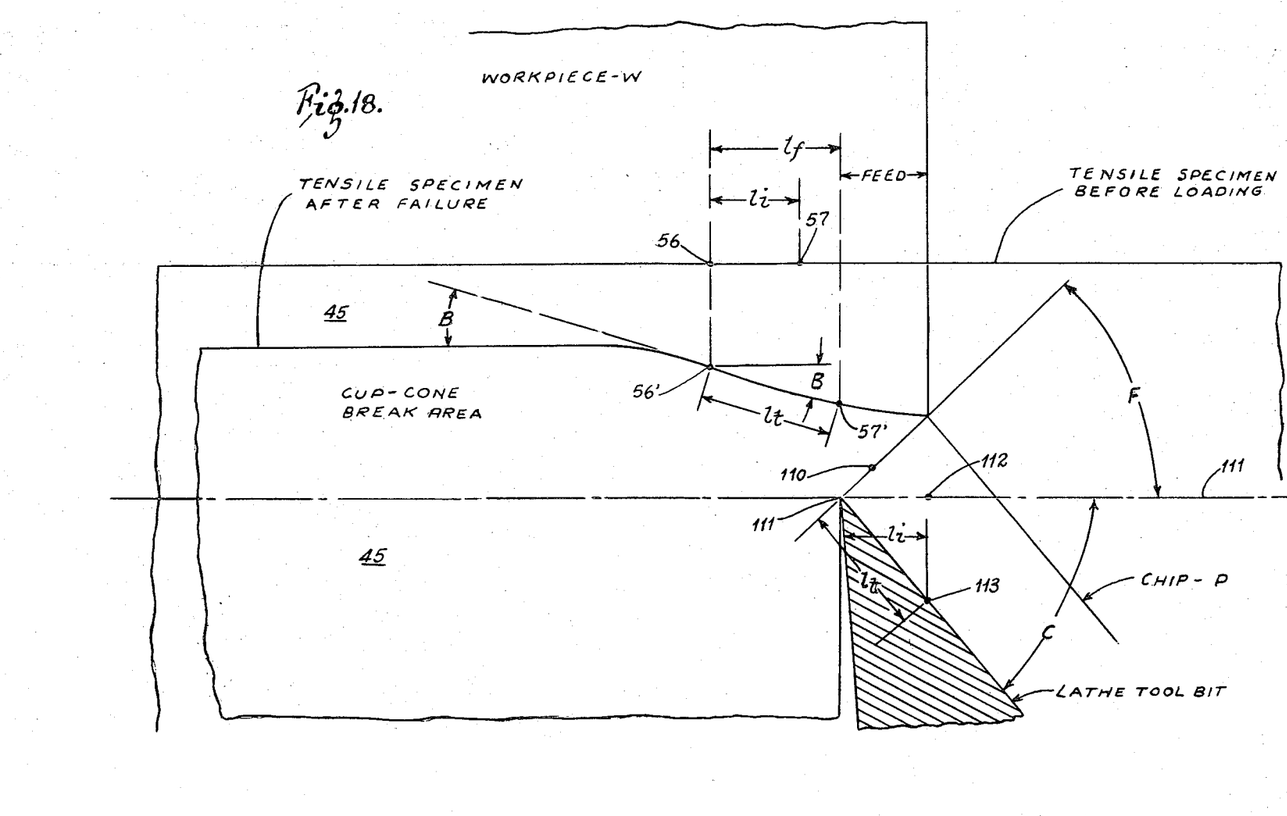
FIG. 18 is an enlarged view of the central portion of FIG. 17.

Like in the test specimen 45, for failure to occur in the workpiece W such as required in machining, the material being machined away must be moved or elongated from an initial length $l_i$ to a true length $l_t$. Otherwise, failure will not occur and the workpiece will not be machined. If the initial width of the chip from the workpiece before failure, which is also the same as the feed of the tool, is $l_i$ and is translated to a new length $l_t$, the minimum work has been accomplished to create a condition of failure along the line 110. Because the initial length $l_i$ must be translated to a true length $l_t$ as shown in FIG. 18, the effective rake angle C of the cutting tool is automatically defined as that angle between $l_i$ and $l_t$, or $\cos C = l_i/l_t$. Hence, a cutting tool having an effective rake angle C such that $\cos C = l_i/l_t$ is the exact effective rake angle required to elongate the initial length $l_i$ to a length $l_t$, which in turn is the minimum that must be done to produce failure in and machining of the workpiece. A cutting tool having an effective rake angle C so defined will require minimum work to produce the failure, resulting in greater efficiency and tool life.

As a corollary to this it has been found that the metal of the tensile specimen 45 in the cup cone area 52, after being tensile loaded to failure is much harder than the metal elsewhere on the specimen. In fact, it has been found that the metal in the cup cone area has been work hardened to a maximum hardness for the particular metal. It has also been found, that where the proper angle C is used for the cutting tool, the chip P formed therewith is work hardened to the maximum hardness for the particular material of the workpiece. This is apparent from the analysis of FIGS. 17 and 18 and when it is remembered that the failure characteristics of the workpiece during machining are the same as the failure characteristics of the specimen in the area of the cup cone when tensile loaded to failure. It is believed that excessive work in producing failure generates additional heat and deforms the granular structure of metal to reduce the hardness of the chip. Hence, according to this invention, the proper angle C is the minimum angle that produces maximum hardness of chips. This can be determined by incrementally increasing the angle C during machining of a particular metal and measuring the hardness of the chips. When the chips become no harder, that value of C is the proper one.

Although the foregoing is believed to be an accurate description of the underlying theory of why the invention works in the manner described to produce a vastly superior cutting tool with greatly increased tool life, its superiority has been demonstrated in actual tests. In these tests carbide tools having geometries defined in accordance with this invention were compared with carbide tools with the conventional geometries of the prior art.

Generally, the tests involved the machining of four different materials, namely, Type 303 stainless steel, AISI 4340 Steel heat treated to Rockwell C 30–31, AISI 1042 Steel, and titanium alloy Ti–6Al–4V. In all of the tests the cutting tools, both the conventional cutting tools and the tools of this invention, were of tungsten carbide and specifically V. R. Wesson Company, RAMET 1. All of the tools were ordered from a special lot and individual tools selected at random and ground to the specified geometry. All tests were run on the same lathe with .004 inch feed and 0.075 inch depth-of-cut. The speeds were varied depending on the material being machined and were the speeds recommended in "Machining Data Handbook," 1972 edition, Metcut Research Association, Inc., compiled under contract with the U. S. Government, and all like diameters of like materials were turned at the same speed. No coolants were used in any of the tests.

The geometry used on the conventional tools were as specified in the above-referenced handbook, and were the same for all conventional tools regardless of which of the four materials were to be machined. The geometry of each and every conventional tool used in these tests was as follows:

Primary rake (side rake) angle $A = -5°$
Secondary rake (back rake) angle $B = -5°$
End relief angle $j = 5°$ Side relief angle $h = 5°$
Side cutting edge angle $g = 30°$
End cutting edge angle $i = 30°$ The cutting edge angles were specified in the referenced handbook as fifteen degrees but were changed to accommodate the tool holder used. This change is believed not to have affected the test results and in any case the same cutting edge angles were used on the tools of this invention.

For each test, that is, for each one of the four materials, all of the workpieces were of equal size and cut from a single bar stock. Additionally, the test samples loaded under tension to failure and used in determining the tool geometries for the tools of this invention were cut from the same single bar stock.

For each of the four tests, samples from the bar stock were made similar to the test bars 45 and 62 and loaded under tension to failure as heretofore described. The neck down angle D, the initial length $l_i$ and the final length $l_f$ were measured. From these measurements the effective rake angle C was calculated in accordance with this invention and the tools of this invention ground accordingly. The side and end relief angles $h_1$ and $j_1$, and the widths $X_1$ and $X_2$ of the side and end lands 91 and 96 were chosen from previous tests in the manner heretofore described. In accordance with this invention the relief angles and land widths were not the same for each of the tests because of the different workpiece material being machined and the different speeds used. The relief angles for the side and end lands 91 and 96 were substantially zero for all tests. All results are given in length of bar cut in inches. Unless otherwise stated, each tool was driven to destruction. The term "still cutting" next to a number means the tool was still cutting when the test was halted as when the bar was used up.

TEST 1

The material machined was Type 303 stainless steel. The geometry of the conventional tool was as heretofore described. The geometry of the tool of this invention was as follows:

Effective rake angle $C = 46°$
Primary rake angle $A = 46°$
Secondary rake angle $B = 0°$
Side and end land widths $X_1$ and $X_2 = 0.005$ in.
Side and end relief angles $h_1$ and $j_1 = 15°$ Four of each type were tested. The results are tabulated as follows:

| Conventional Tool | Tool Of This Invention |
| --- | --- |
| 1. 66¼ | 5. 150⅝ (still cutting) |
| 2. 51⅞ | 6. 146½ (still cutting) |
| 3. 37⅞ | 7. 139 (still cutting) |
| 4. 147⅞ (still cutting) | 8. 5 |
| Totals 303⅞ | 440¾ |

The reason for the poor results for Tool No. 8 is believed to be that the tool was defective.

TEST 2

The material machined was AISI 4340 Steel heat treated to Rockwell C 30-31. The geometry of the conventional tool was as heretofore described. The geometry of the tool of this invention was as follows:

Effective rake angle $C = 40°$
Primary rake angle $A = 40°$
Secondary rake angle $B = 0°$
Side and end land widths $X_1$ and $X_2 = 0.010$ in.
Side and end relief angles $h_1$ and $j_1 = 22°$ Five conventional tools and four tools of this invention were tested. The results are tabulated as follows:

| Conventional Tool | Tool Of This Invention |
| --- | --- |
| 1. 22½ | 6. 30⅞ (still cutting) |
| 2. 18¾ | 7. 34⅝ (still cutting) |
| 3. 12 | 8. 29¼ (still cutting) |
| 4. 25 | 9. 34½ (still cutting) |
| 5. 21½ | |
| Totals 5)99¾/20 | 4)129/32¼ (still cutting) |

It should be noted that all of the conventional tools failed whereas all of the tools of this invention were still cutting when the test was halted. The average tool life of the conventional tool was 20 inches and for the tool of this invention thirty-two and one-fourth inches and still cutting.

TEST 3

The material machined was AISI 1042 Steel. The geometry of the conventional tool was as heretofore described. The geometry of the tool of this invention was as follows:

Effective rake angle $C = 44°$
Primary rake angle $A = 44°$
Secondary rake angle $B = 0°$
Side and end land widths $X_1$ and $X_2 = 0.005$ in.
Side and end relief angles $h_1$ and $j_1 = 20°$ Four tools of each type were tested and the results are tabulated as follows:

| Conventional Tool | Tool Of This Invention |
| --- | --- |
| 1. 14¼ | 5. 39 (still cutting) |
| 2. 13⅝ | 6. 39 (still cutting) |
| 3. 8½ | 7. 39 (still cutting) |
| 4. 13⅝ | 8. 39 (still cutting) |
| Totals 49¾ | 156 (still cutting) |

Again it should be noted that while all of the conventional tools failed, all of the tools of this invention were still cutting when the test was halted.

TEST 4

The material machined was titanium alloy Ti-6Al-4V. This material was chosen because it is very difficult to machine. The geometry of the conventional tool was as heretofore described. The geometries of the tools of this invention were as follows:

For Tools 4 and 5:
  Effective rake angle $C = 33°$
  Primary rake angle $A = 33°$
  Secondary rake angle $B = 0°$
  Side and end land widths $X_1$ and $X_2 = 0.005$ in.
  Side and end relief angles $h_1$ and $j_1 = 20°$ For Tools 6 and 7:
  Effective rake angle $C = 33°$
  Primary rake angle $A = 32°$
  Secondary rake angle $B = -12 \frac{1}{2}°$
  Side and end land widths $X_1$ and $X_2 = 0.005$ in.
  Side and end relief angles $h_1$ and $j_1 = 20°$ This test was verified by an independent test laboratory. Three conventional tools and four tools of this invention were tested and the results are tabulated as follows:

| Conventional Tool | Tool Of This Invention |
|---|---|
| 1. 76¾ | 4. 424¾ |
| 2. 100⅛ | 5. 172⅞ |
| 3. 90¾ | 6. 144½ |
|  | 7. 136½ |
| Totals 3)267¼ | 4)878¼ |
| 89 | 219.5 |

There are several things to note from these test results. One is the radical departures from the rake angles and relief angles taught in the prior art for use on tungsten carbide tools. While the referenced handbook specifies an effective rake angle of $-7°$ for all these materials, the effective rake angles for the tools of this invention for machining these materials range from 32° to 46°, a difference of from 39° to 53°. The relief angles taught by the referenced handbook for machining these materials are 5°, while the relief angles of the tools of this invention for these same materials range from 15° to 22°. The use of such high rake and relief angles on carbide tools, and generally tools of high red hardness, goes directly against the teachings of the prior art.

Figure 19:
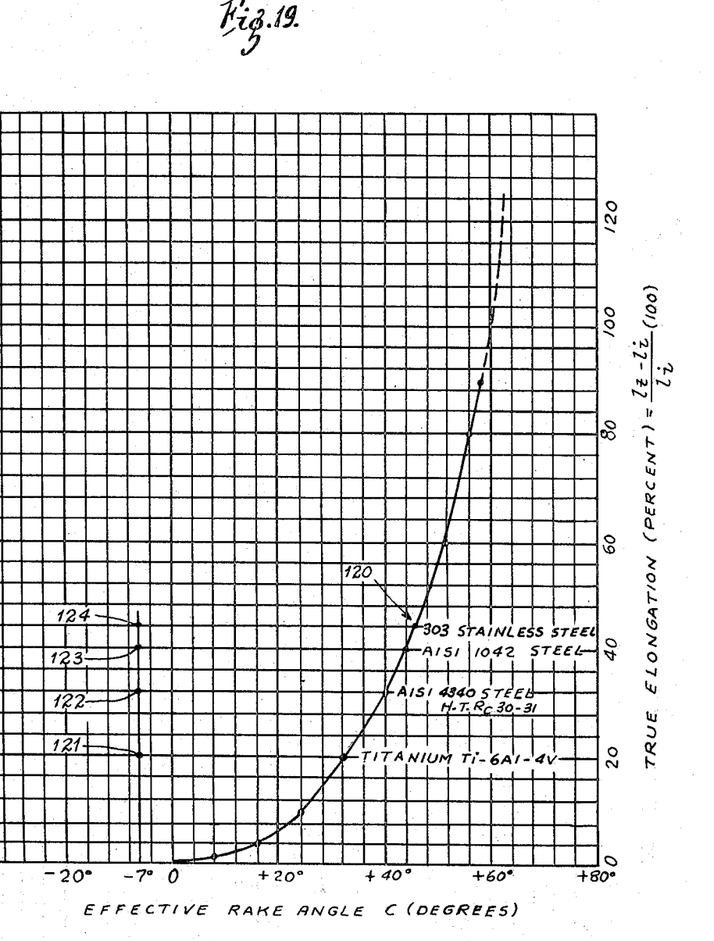
FIG. 19 is a graph showing the relationship between the effective rake angles of cutting tools versus the percents true elongation of materials when tensile loaded to failure for both tools of this invention and prior art tools.

This is further exemplified by the graph of FIG. 19 showing plots of effective rake angle C in degrees versus the true elongation in percent, or $l_t - l_i/l_i$ (100) for metals to be machined. The curve 120 shows this relationship for the tools of this invention, including carbide tools, where $\cos C = l_i/l_t$.

The curve 120 starts at zero indicating an angle C of zero for materials having no true elongation, or zero ductility, and proceeds in a positive direction. The slope of the curve 120 is relatively small below ten percent true elongation and becomes increasingly larger above ten percent. By far most of the metals, except for the very brittle such as the more brittle cast irons and high carbon steels, have true elongations above ten percent. These would include mild and alloyed steels and most of the nonferrous metals such as aluminum, stainless steel, copper, titanium, magnesium, etc. The angle C according to the curve 120 is always positive and at least 24 degrees for all metals of over 10 percent true elongation.

In contrast, the points 121 through 124 show the effective rake angles C for the carbide tools recommended by the "Machining Data Handbook" previously referenced for cutting the metals used in the tests heretofore described. These angles are each a negative seven degrees thus exemplifying the radical departure this invention represents over the prior art.

Hence, there has been described a novel cutting tool having a geometry that machines a metal workpiece with minimum work and maximum efficiency for greatly improved tool life, and a novel method of determining the correct geometry for the tool.

Various changes and modifications may be made in this invention, as will be readily apparent to those skilled in the art. Such changes and modifications are within the scope and teaching of the invention as defined by the claims appended hereto.

What is claimed is:

1. A method of forming a cutting tool for machining a selected metal comprising the steps of subjecting a sample of metal to be cut to tensile loading until the sample fails, determining the magnitude of the neck down angle at the failure area of the sample, determining the magnitude of elongation of the sample in the failure area, establishing the effective rake angle of the tool as a function of the magnitude of the neck down angle and elongation, establishing a side land surface having a relief angle of substantially zero degrees, establishing a side relief surface having a selected side relief angle, using the tool to machine the metal, and selectively changing the width of the side land surface and the magnitude of the side relief angle as needed such that the width of the side land surface becomes substantially constant as the tool is used for machining the metal.

2. The method of claim 1 further comprising the steps of establishing an end land surface having a relief angle of substantially zero degrees, establishing an end relief surface having a selected end relief angle, using the tool to machine the metal, and selectively changing the width of the end land surface and the magnitude of the end relief angle as needed such that the width of the end land surface becomes substantially constant as the tool is used for machining the metal.

* * * * *